United States Patent [19]
Johnson

[11] Patent Number: 6,136,430
[45] Date of Patent: Oct. 24, 2000

[54] DISPOSABLE WATER RESISTANT COVER FOR BULK SALT

[75] Inventor: Philip S. Johnson, Rockford, Minn.

[73] Assignee: Cargill, Incorporated, Minneapolis, Minn.

[21] Appl. No.: 09/129,158

[22] Filed: Aug. 5, 1998

[51] Int. Cl.$^7$ .............................. B32B 5/00; B32B 13/04; B05D 1/02
[52] U.S. Cl. ..................... 428/331; 428/325; 428/454; 428/702; 427/426; 427/427
[58] Field of Search ..................... 405/266, 270, 405/275; 249/10; 427/426, 427; 428/689, 702, 703, 325, 331, 454; 588/3

[56] References Cited

U.S. PATENT DOCUMENTS

| | | |
|---|---|---|
| 2,754,623 | 7/1956 | Mowry et al. ................................ 47/1 |
| 3,640,021 | 2/1972 | Grafmuller .................................... 47/9 |
| 3,943,078 | 3/1976 | James ..................................... 260/17 R |
| 4,071,400 | 1/1978 | Jankowiak .............................. 162/169 |
| 4,076,862 | 2/1978 | Kobeski et al. ......................... 427/136 |
| 4,106,296 | 8/1978 | Leonard, Jr. et al. .................. 61/36 C |
| 4,297,810 | 11/1981 | Hansford ....................................... 47/9 |
| 4,510,180 | 4/1985 | Cornely et al. ......................... 427/136 |
| 5,082,500 | 1/1992 | Nachtman et al. ..................... 106/900 |
| 5,161,915 | 11/1992 | Hansen ................................... 405/129 |
| 5,525,009 | 6/1996 | Hansen ................................... 405/129 |
| 5,604,168 | 2/1997 | Libor ....................................... 501/141 |

*Primary Examiner*—Deborah Jones
*Assistant Examiner*—Stephen Stein
*Attorney, Agent, or Firm*—Fitch, Even, Tabin & Flannery

[57] ABSTRACT

The present invention is directed to a method for forming an inexpensive, semi-permanent cured cementitious cover layer over deicing salt which is stored outdoors in large bulk mounds or piles and a salt pile or mound covered with such a layer.

22 Claims, No Drawings

DISPOSABLE WATER RESISTANT COVER FOR BULK SALT

FIELD OF THE INVENTION

The present invention generally relates to the covering of bulk salt piles stored outdoors. More particularly, the invention relates to covering bulk salt piles or mounds which are stored outside or outdoors where the salt is waiting to be spread as a deicing composition and where the cover for the salt is concrete or cement which will easily break up into particulate matter which will spread along with the deicing composition.

BACKGROUND OF THE INVENTION

Millions of tons of deicer salt in the form of sodium chloride, calcium chloride and magnesium chloride is applied in many countries to roads, bridges and sidewalks during the cold winter season to melt ice and snow. Sodium chloride is most commonly used, but all of these salts have to be stored and be ready for transport and spreading at indeterminate times depending upon the weather. Storing deicing salts, such as sodium chloride, outdoors exposed to the elements, however, creates problems. Rain and snow will wet the salt which will solubilize to some extent and then form a hard crust which will cause spreading problems. Rain, snow and wind also will erode the piles. This causes several problems. The salt pile will spread and require more area for storage. Also the water from the rain and snow will solubilize a portion of the salt and it will be lost as a part of a brine type of run off. But even more important, the aqueous solution of salt which forms the run off is an environmental problem which can contaminate surface water and ground water and will be detrimental to surrounding vegetation.

To solve the aforedescribed problems salt piles have been covered with tarpaulins. In some cases, structures have been built to house the salt, such as "beehive" shaped structures often seen by the roadsides in the northern American Midwest. These solutions, however, are not without drawbacks. The tarpaulins are expensive, heavy and difficult to move. They are also subject to inadvertent ripping and tearing by earth moving equipment loading salt onto spreader trucks. The structures used to house salt are expensive and also prone to inadvertent damage during the movement of the bulk salt.

It is an object of this invention to provide an easy way to cover bulk salt stored outdoors so that it will be protected from rain, snow and wind.

It is an object of this invention to reduce brine run-off from bulk salt stored outdoors.

It is yet another object of this invention to provide a cover for a bulk salt pile or mound that will retain the integrity of the salt pile or mound.

These and other objects, advantages, features and characteristics of the present invention will become more apparent upon consideration of the following description and appended claims.

SUMMARY OF THE INVENTION

The present invention is directed to a method for forming an inexpensive, semi-permanent cover layer over deicing salt which is stored outdoors in large bulk mounds or piles. The cover layer protects the salt from moisture, wind and other erosive elements so that the salt can be stored outdoors for extended periods of time without experiencing agglomeration of the salt particles from moisture, erosion or deterioration of the salt mound and without experiencing the deteriorating effects of the elements. The cover layer protects the salt by forming a continuous coating over the exposed surface of the salt mound or pile and eliminates or substantially eliminates brine water run off from the pile that would otherwise occur as a result of moisture from the elements solubilizing and then transporting dispersed or solubilized salt from the bulk salt pile. Moreover, the invention has the additional advantage of allowing easy recovery of the salt after some of the salt pile has been removed. As it becomes desirable to remove a volume of salt from beneath the cover layer, a portion of the cover layer may be broken and removed as necessary to expose the salt and provide access for its removal. In this way, the remaining portion of the cover layer may be left on the salt until it is desired to remove more of the salt. A cover layer then may be reapplied to cover any areas of the salt pile that are exposed as a result of removing salt from the pile.

Broadly, the cover layer formed by the method of the invention comprises cement, and in an important aspect, concrete, without the substantial use of any other organic polymeric material which will form a polymeric coating or layer. The cover layer, which forms a water resistant coating over the salt mound, is of a thickness which is effective for maintaining the integrity of the salt mound for at least a year when exposed to the outdoor elements and which is effective for minimizing passage of moisture to the salt for at least that time. The cover composition is brittle and readily broken into particulates which can be spread with the particulate salt, but the cover or layer is effective for providing a cover layer over the salt that is a continuous, hardened coating which generally protects the salt from water and keeps the integrity of the mound or pile of bulk salt comprising sodium chloride, calcium chloride, magnesium chloride and mixtures thereof. Further, the cover composition is entirely compatible with the end use of the deicing salt. As the deicing salt is used, an amount of the cover will be crushed and intermixed with the salt without deleterious effect to the salt. Indeed, the crushed cover will enhance some aspects of the use of the deicing salt because its particles will enhance traction over ice and snow.

In an important aspect, the method of the invention includes applying a dry concrete composition on the salt mound (especially sodium chloride in the form of rock salt), the concrete composition comprising from about 10 to about 70 weight percent, based upon the weight of the dry cementitious blend, cement and from about 30 to about 90 weight percent, based upon the weight of the blend, aggregate which has a particle size of not greater than about 10 U.S. standard mesh. The aggregate also should not be too fine to assure that the cover will not be too hard and stay brittle so that the salt can be readily accessed without damage to moving equipment such as front loaders. Larger aggregate causes the concrete to break too easily since the aggregate dimensions will approach or exceed the thickness of the concrete layer. Also keeping the size of the aggregate to not greater than 10 mesh provides a cover which can be reduced to particulates which are in a size such they can be spread with spreader equipment along with the salt on surfaces with ice and snow. In an important aspect the aggregate is selected from the group consisting of sand, fly ash, silica and mixtures thereof.

The dry composition is applied to the surface of the salt mound in an amount which is effective for providing a cured layer of concrete having a thickness of from about 0.1 to about 1.0 inch, and in an important aspect about 0.5 inch. Thereafter, water is sprayed on the dry composition after the composition has been applied to the salt in order to form a solid, essentially impermeable cover layer of cement or concrete after curing. The amount of water applied ranges from about 30 to about 700 mL per square foot of salt surface to be covered with the composition and is a function of the amount of cementitious composition used. The thickness of the cover layer is generally from about 0.1 to about 1.0 inch, and as noted above, in an important aspect about 0.5 inch.

In very important aspect of the invention, the concrete composition as described above is applied with water in a wet application method to form the cover layer on the salt. In this aspect, the dry composition is mixed with water in amounts as described above prior to application. The aqueous composition then is sprayed as a slurry over the exposed surface of the salt.

According to the method of the invention, the cover layer is formed over the exposed surface of the stored salt using a dry application method. In a very important aspect, the pile or mound of salt is permitted to shift or settle, such as from about 3 to about 7 days before the cementitious composition is applied to the salt. The dry composition first is applied directly to the exposed surface of the salt with an eductor nozzle or other conveying equipment, and thereafter water is sprayed thereon in the amounts described above. The wet composition also can be applied as a cementitious slurry using an eductor nozzle or hydraulic pump. The wet or dry composition is applied in an amount which is effective for maintaining the integrity of the salt mound for at least about one year when exposed to the outdoor elements and which is effective for minimizing passage of moisture to the salt for at least that time, which as a wet slurry is generally, about 1 to about 12 pounds of composition per square foot of the surface of the salt (or 0.5 to about 12 pounds as a dry composition).

DESCRIPTION OF THE DETAILED EMBODIMENTS OF THE INVENTION

As used herein, "cement" means any inorganic substance that is capable of setting and hardening with water, as a result of the interaction of water with the constituents of the substance, to act as a bonding agent for materials. By "cement" is meant to include the class of hydratable or hydraulic cements such as portland cement, sorrel cement, calcium-aluminate cement, magnesia cement, gypsum cement and mason's cement.

As used herein, "hydratable cement" or "hydraulic cement" means self-curing cements which cure with water of hydration such as Sorrel cement, Portland Cement, Pozzolan cement and calcium aluminate cement.

As used herein, "Portland cement" means a mixture of limestone silica and clays which is calcined and then mixed with gypsum.

As used herein, "Sorrel cement" means a hydrated combination of $MgCl_2$ and MgO, $MgSO_4$ and MgO or $MgCl_2$ or $MgSO_4$. The ratio of $MgCl_2$ or $MgSO_4$ to MgO in Sorrel cement broadly is about 1:1 to about 1:30 (or 1:0.42 to 1:1:13 weight ratio). Sorrel cement can include a combination of $MgCl_2$, $MgSO_4$ and MgO with the $MgSO_4$ being at least partially interchangeable with $MgCl_2$.

As used herein, "calcined gypsum" means $CaSO_4 \cdot \frac{1}{2}H_2O$ and $CaSO_4$ in the form of Keene's cement which when combined with water, hydrates and forms hydrated gypsum or gypsum cement.

As used herein, "concrete" means a cementitious substance which is a mixture of cement, aggregate and water, and optionally, any additives, such as fibrous binder, drying enhancer or water repellant.

As used herein, "aggregate" means fly ash, sand, silica and any material derived from rock or manufactured from clays, shales, slates and slags.

As used herein, "water repellent" means any material that reduces the cover layer's permeability to and absorption of water.

As used herein, "water resistant" means the ability to repel water so as to minimize the passage of water therethrough.

The invention comprises a salt mound having a water resistant cover layer comprising cementitious composition comprising cement or concrete where the cover layer after curing has a thickness which is effective for maintaining the integrity of the salt mound for at least a year when exposed to outdoor elements and which is effective for minimizing passage of moisture to the salt for at least one year. The cured layer of concrete or cement will have a thickness of from about 0.1 to about 1.0 inch which will require that from about 0.5 to about 12 pounds of dry composition is applied to every square foot of salt surface. Sufficient water is mixed with the cement or concrete to permit it to cure into a solid, essentially impermeable, cover layer of cement or concrete. The amount of water mixed with the cement or concrete ranges from about 30 to about 700 mL per square foot of salt surface to be covered with the composition and is a function of the amount of cementitious composition used.

To increase water resistance of the cover layer, a water resistant additive also can be mixed with the dry cement or concrete before it is applied to the salt or the additive may be mixed with the aqueous cementitious slurry being applied to the salt mound. Alternatively, the water resistant additive composition may be applied over the cover layer after application of the concrete. In general the water resistant additive when applied with the wet or dry cementitious composition comprises from about 0.3 to about 15 weight percent, based upon the weight of the dry cementitious composition. Any water resistant additive, or mixtures thereof, which are known to those skilled in the art can be used. Suitable additives include fly ash and silica, such as silica available as Microsilica EMS 965 by Elkem Materials Inc. or Fumed Silica Aerosil R 972 by Degussa Corp. Other commercial additives may be used such as Akona Cement Waterproofer #1625 by Akona Inc. and DAP Water Stop and Plug by D.A.P. Inc. Suitable water-proofing solutions also can be sprayed onto the cured cementitious cover to enhance the water resistant effect of the cover layer include Everflex GT by Hampshire Chemical Corporation.

In another aspect of the invention, the composition may include cement or concrete fibrous binder to prevent cracking. The fibrous binder may be selected from the group consisting of flax shives and commercially available fiber glass binders or polymeric fiber binder resins. These binders may be used in an amount of from about 0.5 weight percent to about 3 weight percent based upon the weight of the dry cementitious composition.

In yet another aspect, the composition may include an accelerator to provide a quick curing cover layer. Calcium aluminum cement is a suitable accelerator and may be included in the dry cementitious composition in an amount of from about 1 weight percent to about 20 weight percent based upon the weight of the dry cementitious composition.

According to the method of the invention, it is important that the salt mound be permitted to settle and shift for about three to seven days after the salt pile is created and before the cementitious composition is applied to the pile or mound. The cementitious composition, whether wet or dry, may be applied by an eductor sprayer with the sprayer being operated from a moveable "cherry picker" whereby an operator would aim a spray of the concrete over the bulk salt. Alternatively the cementitious composition may be applied using a hydraulic pump with commercially available nozzles.

The following examples illustrate the invention and the method of the invention and should be understood to be illustrative of, but not limiting, upon the scope of the invention which is defined in the claims.

EXAMPLES

In each of the Examples below, the concrete is applied to provide a cure layer of about 0.5 inch. In each of the Examples, the concrete is applied over two mounds or piles of salt where one pile is covered using the dry application method and one pile is covered using the wet application method. In Examples where an additive is used, unless otherwise noted, the additive is mixed in with the concrete composition prior to application.

1. Plain concrete. 30–80%–10 U.S. mesh sand. 20–70% cement is applied wet and dry to form to form a covering about 0.5 inch thick.
2. 3.0% Microsilica EMS 965 added to concrete. Additive produced by Elkem Materials Inc., Park West Office Center, Pittsburgh, Pa. 15230 30–80%–10 U.S. mesh sand. 20–70% cement is applied wet and dry to form a coating about 0.5 thick.
3. 0.3% Fumed Silica Aerosil R 972 added to concrete. Additive produced by Degussa Corp., 3500 Embassy Parkway, Akron, Ohio 44333 30–80%–10 U.S. mesh sand. 20–70% cement is applied wet and dry to form a coating about 0.5 thick.
4. 2.8% Akona Cement Waterproofer #1625 added to concrete. Additive produced by Akona, Inc., 1570 Halfren Road, Maple Plain, Minn. 55359 30–80%–10 U.S. mesh sand. 20–70% cement is applied wet and dry to form a coating about 0.5 thick.
5. 5.0% DAP Water Stop and Plug added to concrete. Additive produced by D.A.P., Inc., 2400 Boston St., Baltimore, Md. 21224 30–80%–10 U.S. mesh sand. 20–70% cement is applied wet and dry to form a coating about 0.5 thick.
6. Plain Concrete applied then sprayed with Everflex GT. Additive produced by Hampshire Chemical Corporation, 55 Hayden Ave., Lexington, Mass. 02173 30–80%–10 U.S. mesh sand. 20–700% cement concrete.

What is claimed is:

1. A method of protecting deicing salt from erosive elements, which deicing salt is stored outdoors in bulk mounds or piles, the method comprising covering the salt with a cementitious composition to provide a cured cementitious cover for the salt, the cured cover having a thickness which is effective for maintaining the integrity of the salt mound for at least a year when exposed to outdoor elements and which cementitious composition after curing provides the cured cementitious cover which is effective for minimizing passage of moisture to the salt for at least one year, the cured cementitious composition comprising cured cement, sand and a water resistant additive in an amount effective for increasing the water resistance of the cured cementitious composition, the sand having a particle size of not more than about 10 U.S. standard mesh.

2. A method for protecting a deicing salt from erosive elements as recited in claim 1 wherein the cementitious composition comprises from about 10 to about 70 percent cement, based upon the weight of a dry uncured cementitious composition, from about 30 to about 90 weight percent sand, based upon the weight of a dry uncured cementitious composition, and from about 0.3 to about 15 weight percent water resistant additive, based upon the weight of a dry uncured cementitious composition.

3. A method as recited in claims 1 or 2 wherein the cured cementitious cover has a thickness of from about 0.1 to about 1 inch.

4. A method as recited in claim 1 wherein an aqueous slurry of the cementitious composition is applied to the salt.

5. A method as recited in claims 1 or 2 wherein the method further comprises providing a mound or pile of salt and permitting the mound or pile of salt to settle for at least about three days before covering the salt with the cementitious composition.

6. A method as recited in claim 1 wherein the cementitious composition comprises at least about 30 weight percent aggregate based upon the weight of a dry cementitious composition.

7. A method of providing a water resistant cover layer over bulk salt stored outdoors in mounds comprising:

applying a dry cementitious composition over a mound of bulk salt, the cementitious composition comprising cement, sand and a water resistant additive in an amount effective for increasing the water resistance of the cured cementitious composition, the sand having a particle size of not more than about 10 U.S. standard mesh;

spraying water over the dry composition in an amount effective for forming a continuous layer of thickness which when cured is effective for maintaining the integrity of the salt mound for at least a year when exposed to outdoor elements and which is effective for minimizing passage of moisture to the salt for at least one year; and allowing the layer to set for a time effective for curing the composition to provide a cured water resistant cementitious cover layer.

8. A method as recited in claim 7 wherein the cured cementitious layer has a thickness of from about 0.1 to about 1 inch.

9. A method for providing a water resistant cover as recited in claims 7 or 8 wherein the cementitious composition comprises from about 10 to about 70 percent cement, based upon the weight of a dry uncured cementitious composition, from about 30 to about 90 weight percent sand, based upon the weight of a dry uncured cementitious composition, and from about 0.3 to about 15 weight percent water resistant additive, based upon the weight of a dry uncured cementitious composition.

10. A method as recited in claims 7 or 8 wherein the method further comprises providing a mound or pile of salt and permitting the mound or pile of salt to settle for at least about three days before covering the salt with the cementitious composition.

11. A method as recited in claim 8 wherein the cementitious composition comprises at least about 30 weight percent aggregate based upon the weight of a dry cementitious composition.

12. A method as recited in claims 7 or 8 wherein the dry cementitious composition is applied in an amount of from about 0.5 to about 12 pounds per square foot of the surface of the salt, based upon the dry weight of the cementitious composition.

13. A method as recited in claim 11 wherein the method further comprises providing a mound or pile of salt and permitting the mound or pile of salt to settle for at least about three days.

14. A method of providing a water resistant cover layer over bulk salt stored outdoors in mounds comprising:

mixing cement, sand, a water resistant additive, and water, the amount of water effective for forming a sprayable cementitious slurry and the water resistant additive in an amount effective for increasing the water resistance of the cured cementitious composition, the sand having a particle size of not more than about 10 U.S. standard mesh;

spraying the cementitious slurry over a mound of bulk salt in an amount effective for forming a continuous layer of thickness which when cured is effective for maintaining the integrity of the salt mound for at least a year when exposed to outdoor elements and which is effective for minimizing passage of moisture to the salt for at least one year; and allowing the layer to set for a time effective for curing the composition to provide a cured water resistant cementitious cover layer.

15. A method as recited in claim 14 wherein the cured cementitious layer has a thickness of from about 0.1 to about 1 inch.

16. A method for providing a water resistant cover as recited in claims 14 or 15 wherein the cementitious composition comprises from about 10 to about 70 percent cement, based upon the weight of a dry uncured cementitious composition, from about 30 to about 90 weight percent sand, based upon the weight of a dry uncured cementitious composition, and from about 0.3 to about 15 weight percent water resistant additive, based upon the weight of a dry uncured cementitious composition.

17. A method as recited in claim 14 wherein the cementitious composition comprises at least about 30 weight percent aggregate, based upon the weight of a dry cementitious composition.

18. A method as recited in claim 17 wherein the method further comprises providing a mound or pile of salt and permitting the mound or pile of salt to settle for at least about three days before covering the salt with the cementitious composition.

19. A salt mound having a water resistant cover layer comprising a cured cementitious composition which comprises cured cement, sand and a water resistant additive in an amount effective for increasing the water resistance of the cured cementitious composition, the sand having a particle size of not more than about 10 U.S. standard mesh, wherein the cover layer has a thickness which is effective for maintaining the integrity of the salt mound for at least a year when exposed to outdoor elements and which is effective for minimizing passage of moisture to the salt for at least one year.

20. A salt mound as recited in claim 19 wherein the cured cementitious layer has a thickness of from about 0.1 to about 1 inch.

21. A salt mound having a water resistant cover as recited in claims 19 or 20 wherein the cementitious composition comprises from about 10 to about 70 percent cement, based upon the weight of a dry uncured cementitious composition, from about 30 to about 90 weight percent sand, based upon the weight of a dry uncured cementitious composition, and from about 0.3 to about 15 weight percent water resistant additive, based upon the weight of a dry uncured cementitious composition.

22. A salt mound as recited in claim 20 wherein the cementitious composition comprises at least about 30 weight percent aggregate based upon the weight of a dry cementitious composition.

* * * * *